United States Patent

[11] 3,565,285

[72] Inventor Floyd Asnes
    Little Neck, N.Y.
[21] Appl. No. 692,909
[22] Filed Dec. 22, 1967
[45] Patented Feb. 23, 1971
[73] Assignee Alfa Industries, Inc.,
    Little Neck, N.Y.

[54] BUTTON FEEDING MACHINE
    7 Claims, 13 Drawing Figs.
[52] U.S. Cl. .................................................. 221/267,
    221/270, 221/274
[51] Int. Cl. ...................................................... B65g 59/00
[50] Field of Search ............................................. 221/156,
    186, 267, 270, 274; 194/(P.D.)

[56] References Cited
    UNITED STATES PATENTS
    2,193,918  3/1940  Chalmers et al. ............. 221/270X
    3,042,255  7/1962  Halbreich ..................... 221/186
    3,089,443  5/1963  Asnes ........................... 221/267X
    1,032,389  7/1912  Elliott ........................... 221/274X
    1,134,305  4/1915  Wiesner ........................ (194/P.D.)

Primary Examiner—Samuel F. Coleman
Attorney—Darby & Darby

ABSTRACT: A button-feeding machine for sequentially feeding buttons located in a hopper through a chute to a holder in which the buttons are held in proper position for attachment to a cloth article by a sewing needle. The buttons are supplied in bulk to a hopper where they are oriented and aligned in a chute and then positively fed from the chute to the holder, one at a time by a ram arm whose actuation is controlled by a machine operator.

INVENTOR
FLOYD ASNES

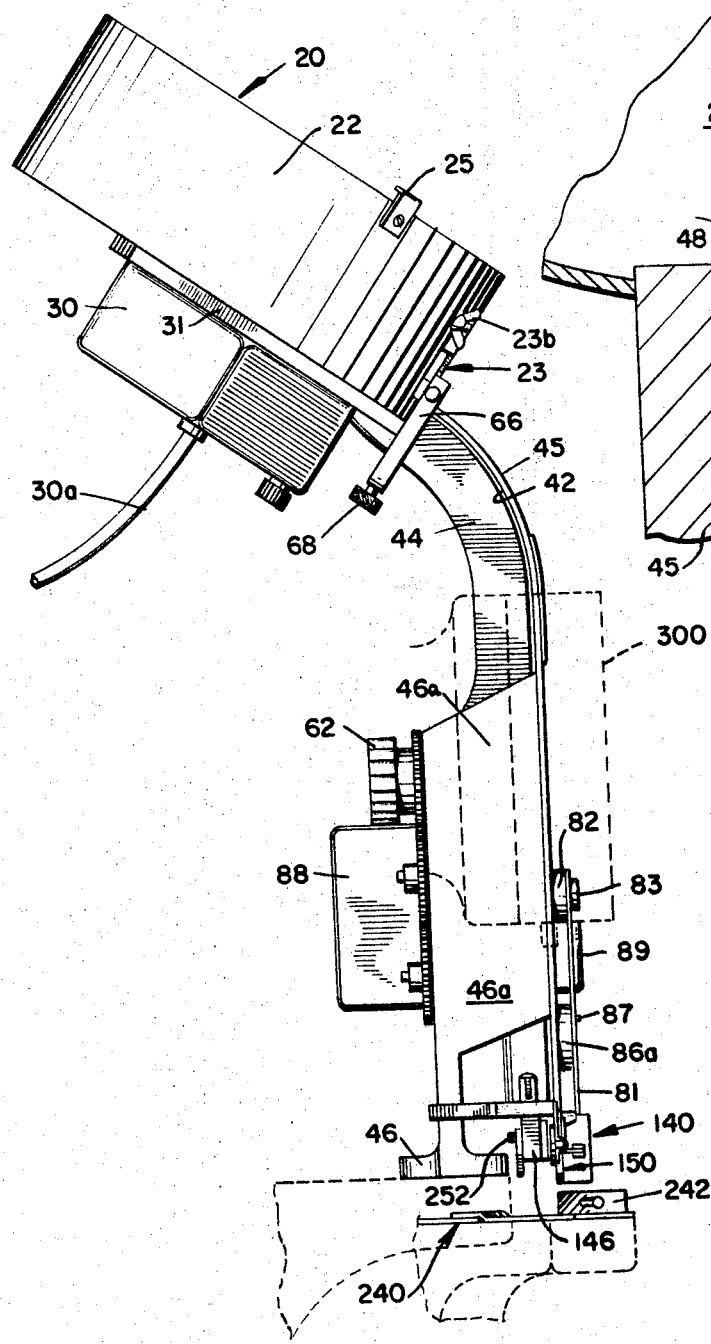
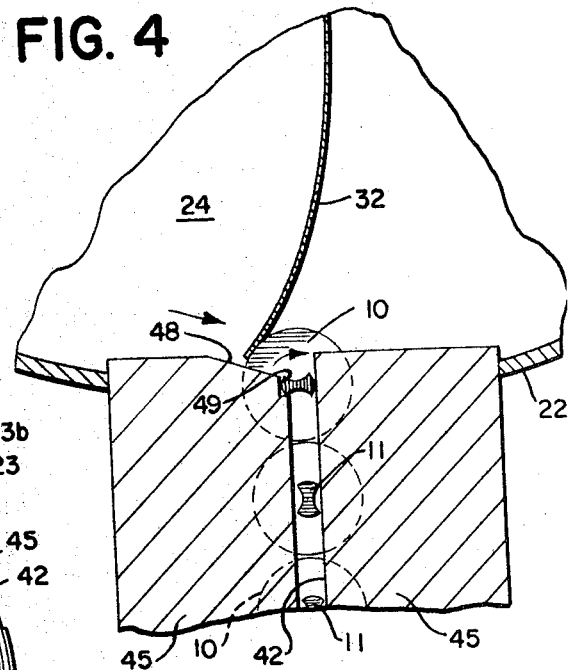

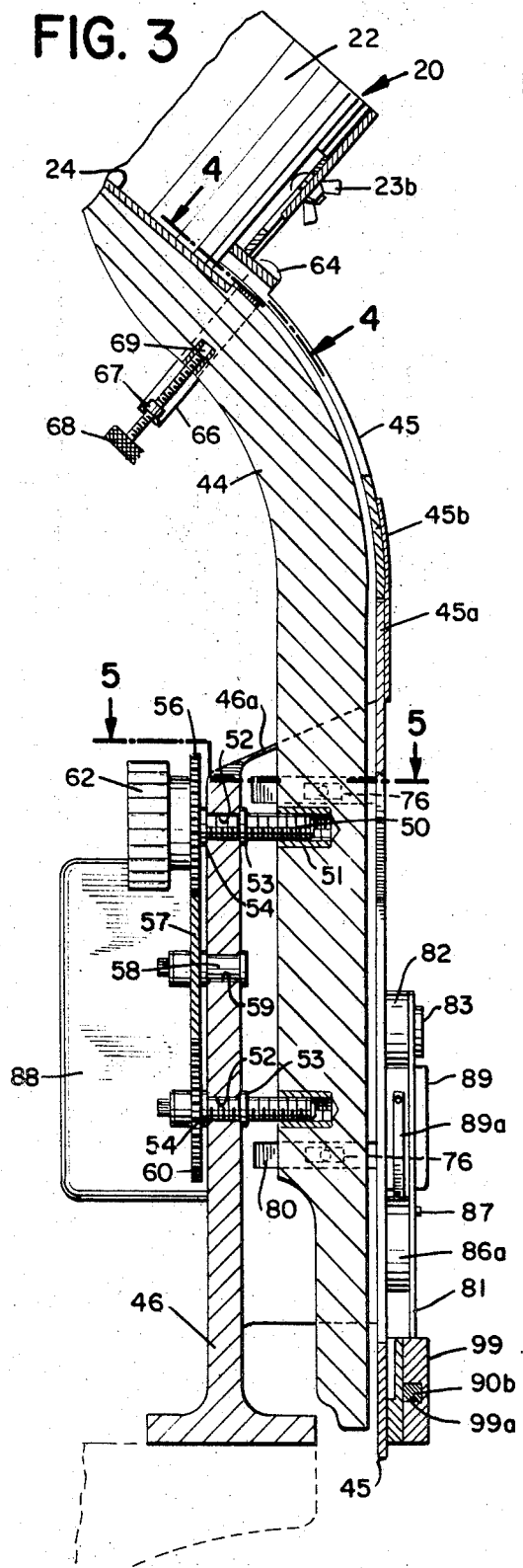
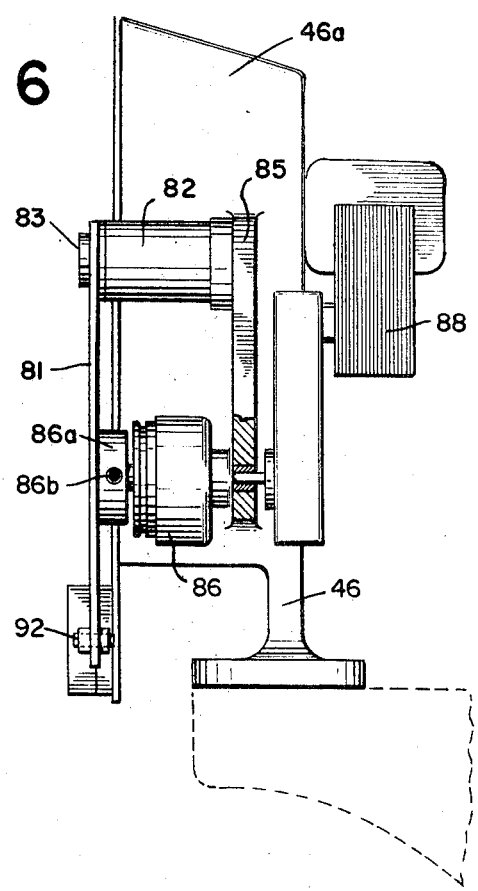
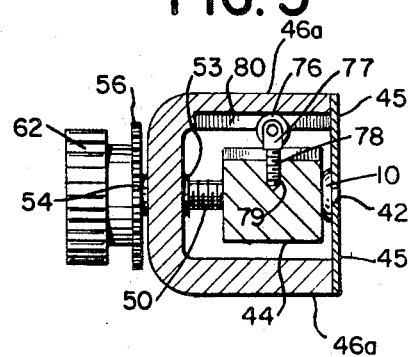
FIG. 3
FIG. 6
FIG. 5
INVENTOR
FLOYD ASNES
BY Darby & Darby
ATTORNEYS

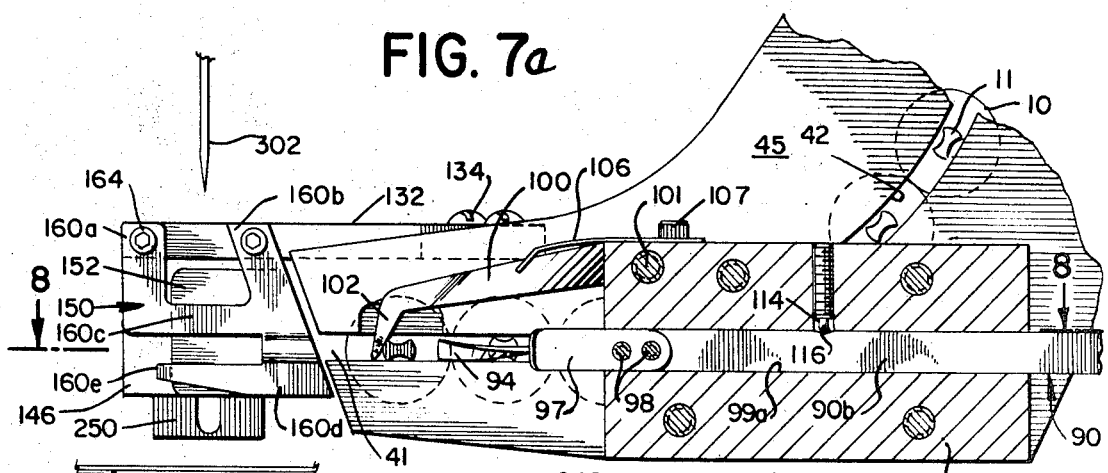
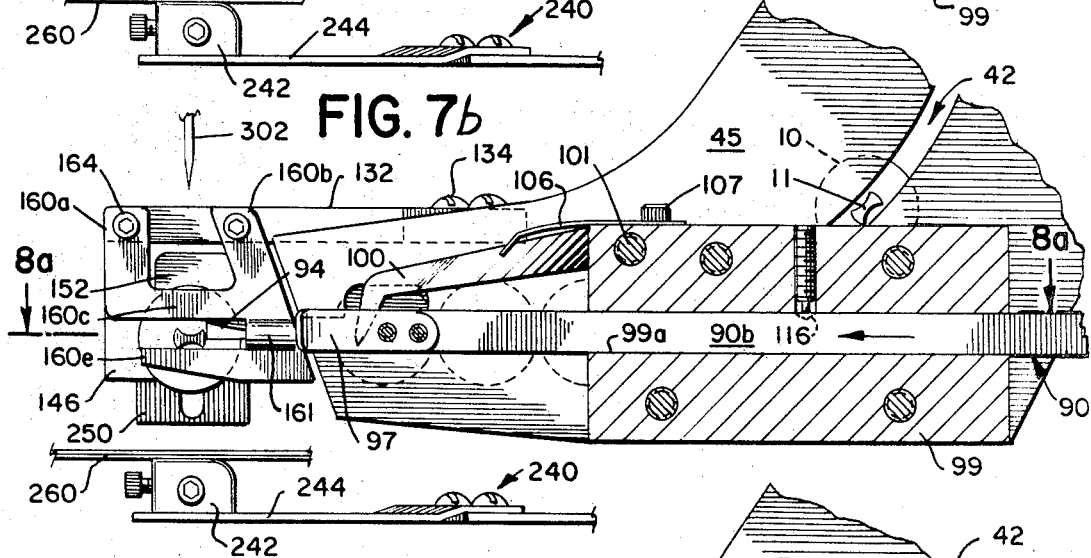
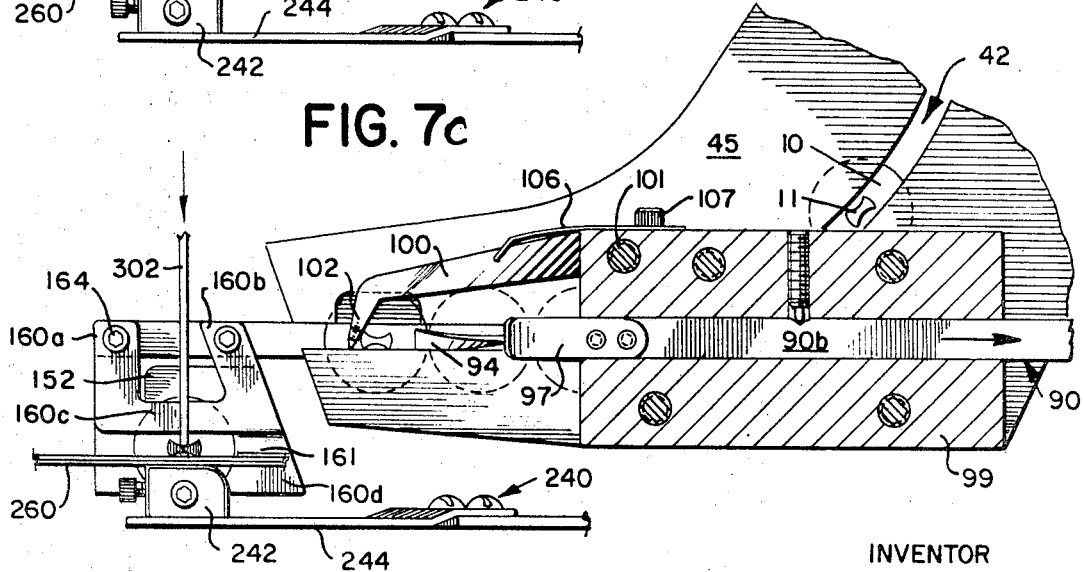
INVENTOR
FLOYD ASNES

PATENTED FEB23 1971 3,565,285

INVENTOR
FLOYD ASNES

BY Darby & Darby

ATTORNEYS

BUTTON FEEDING MACHINE

The present invention relates to apparatus for feeding buttons sequentially from a hopper into a holder where they are held so that they can be sewn onto a piece of cloth by a sewing machine. Apparatus of this type known previously in the art have several disadvantages. First of all, the sequential feeding of the buttons from the chute to the holder is not done in any positive manner but, instead, relies on the force of gravity. When using only the gravity force, the location of the button in the holder is often improper and thus makes the sewing of the button onto the cloth considerably more difficult and, in some cases, impossible. In addition, with many of the prior art machines, the button-holder position must be adjusted for each change in size of the buttons being fed. Further, in prior art machines, the various parts of the button holder have been subject to bending and breakage.

The present invention relates to an improved button-feeding machine in which the foregoing problems, as well as other problems, are eliminated. In accordance with the present invention, an improved button-feeding machine is provided in which buttons are placed in bulk into a hopper. The hopper is of a simplified and novel construction which aligns the button for feeding one by one into a chute. The chute is a two-piece member which has a curved upper portion and a flat lower portion. The spacing and alignment between the two chute members in the lower portion of the chute is adjusted by a novel gear operated, threaded pin arrangement. The spacing of the curved upper portion of the chute is accomplished by a novel yoke and bracket arrangement.

The buttons aligned in the chute are fed one at a time under the control of the machine operator by a novel ram arm mechanism which engages a button and moves it in a controlled manner from the chute a predetermined distance into the button holder. In addition, the button holder is also of a novel and simplified construction and includes a rigid front clamp member which operates in conjunction with a leaf-spring-type back member. The leaf spring is located at an angle with respect to the chute exit so that clamping action of the button in the holder is provided for a number of different sizes of buttons without moving the holder.

It is therefore an object of the present invention to provide a novel button-feeding machine in which the buttons are fed from a chute member by the positive actuation of a ram arm.

A further object is to provide a button-feeding machine in which buttons are aligned in a chute in a novel manner.

An additional object is to provide a button-feeding machine having a two-section chute formed by complementary front and rear pieces, the distance between the chute pieces of the first and second sections being adjustable separately.

Another object is to provide a button-feeding machine having a novel button-holding member formed with a leaf spring.

Other objects and advantages of the present invention will become more apparent upon reference to the following specification and annexed drawings, in which:

FIG. 2 is a side elevational view of the assembled machine;

FIG. 3 is a side elevational view taken in cross section along the lines 3-3 of FIG. 1 showing a portion of the machine;

FIG. 4 is a sectional view of a portion of the front of the machine looking into the front of the machine along lines 4-4 of FIG. 3 showing the arrangement for aligning the buttons;

FIG. 5 is a cross-sectional view of a portion of the chute looking down along lines 5-5 of FIG. 3;

FIG. 6 is a side elevational view of the clutch and drive mechanism;

FIGS. 7a, 7b and 7c are views, shown partially broken away, showing the operation of the ram finger and the details of the button holder;

GENERAL DESCRIPTION OF THE MACHINE ORGANIZATION

Figure 1:
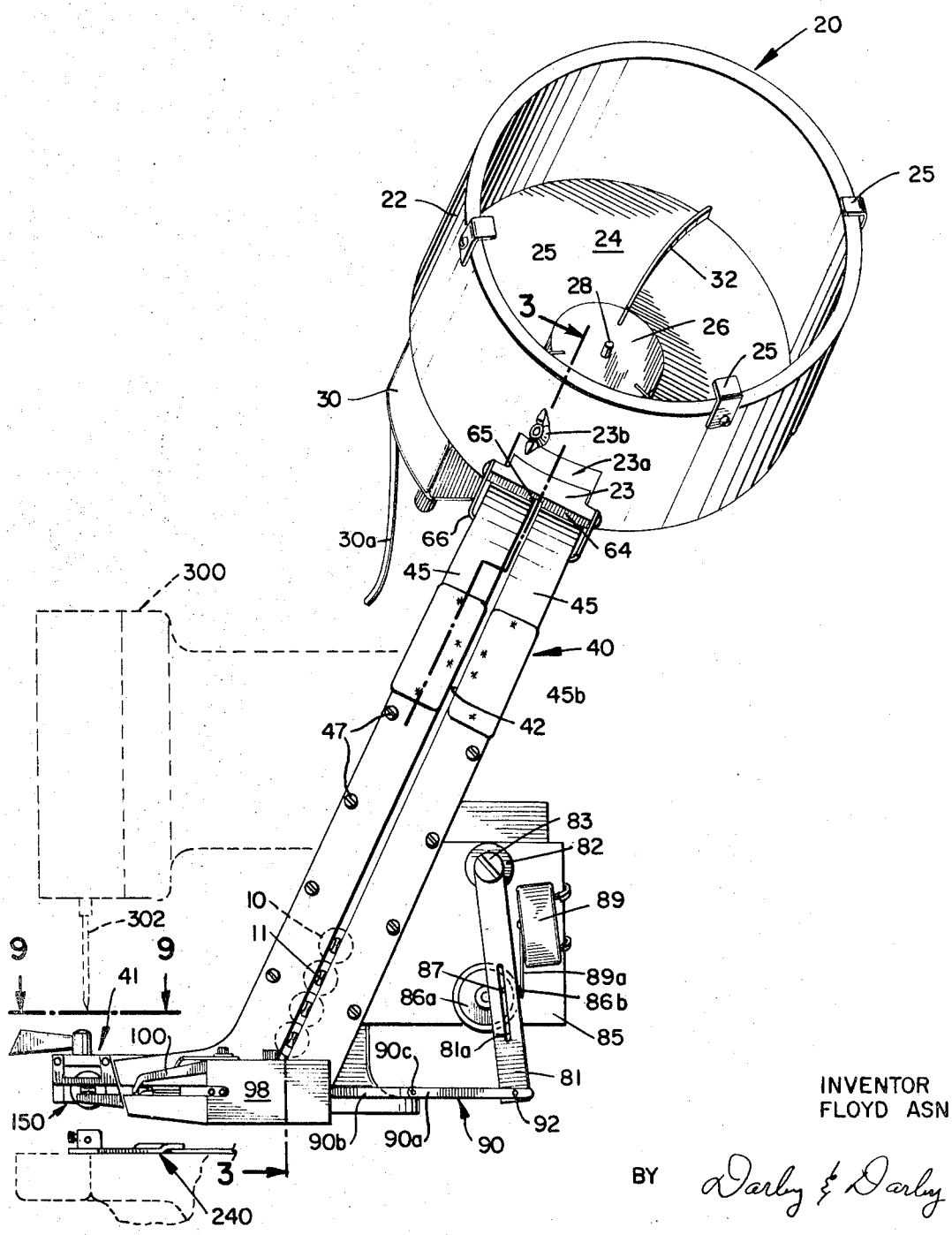
FIG. 1 is an elevational view showing the general assembly of the machine.

Referring to FIGS. 1 and 2, the button feeding machine of the present invention is designed to accept a number of headed buttons 10 having shanks 11 thereon in a hopper 20. The buttons 10, placed with any orientation in the hopper 20 are aligned therein and progressed down a two-piece chute 40 formed by rear and front members 44 and 45, the latter of which has a track 42 therein to accept the shanks. The distance between the two chute members 44 and 45 is adjustable to accommodate buttons whose heads are of different thicknesses.

The aligned buttons 10 are gravity fed down the chute 40 to its exit end 41. From here they are positively fed one at a time by the action of a power driven ram arm 90 into a button holder 150 which holds the fed button with its shank in position for sewing therethrough aligned beneath the needle 302 of a sewing machine 300. The positive one-at-a-time feed of the buttons into holder 140 is operator controlled to place the button in holder 140 above an operator-controlled, vertically movable shoe-plate member 240 on which a garment or piece of cloth is held. The operator completes a sewing operation by sewing the held button onto the garment, removing the button from holder 140 and then initiating another cycle to feed another button into the holder 140.

The various components of the machine are described in detail below.

Feed Hopper

Referring to FIGS. 1—4, the feed hopper 20 comprises a cylindrical bowl 22 having a bottom wall 24. The bottom wall 24 is mounted on the upper, curved end of the rear chute member 44 so that it is slightly tilted with its exit aperture 23 adjacent the upper end of the chute 40, which in turn is connected to the main base support 46. The adjustable mounting of the rear chute member to base 46 is described in detail below. The base member 46 has a flanged bottom piece for securely mounting the base to any support, such as a table. A plurality of screw-mounted clips 25 are provided around the upper lip of the bowl 22 to accept and hold a complete or partial cover or screen (not shown) if such is used to prevent the buttons from spilling out of the open top of the bowl.

A circular hub 26 is located in the bottom of the bowl and is mounted on a rotatable shaft 28 which is the output shaft of a motor 30 mounted on an extension plate 31 of the rear chute member 44. The motor 30 is of the continuously operating type and has a power cord 30a connected thereto for connection to a suitable source of voltage, either alternating or direct current depending upon the motor selection. The switch for turning motor 30 on and off is not shown. The output shaft of motor 30 can also be geared to drive the hub 24 in any conventional manner.

A number of elongated fingers 32, illustratively shown as being three, are mounted to the hub 26 for rotation therewith. The fingers 32 are made of a resilient material, such as spring steel, and they extend substantially completely out to the bowl sidewall so that no buttons can be trapped between the ends of the fingers and the sidewall.

An adjustable curtain 23a is mounted on the inside of the bowl 22 above the exit aperture 23. The vertical position of curtain 23a is adjustable by a nut and bolt 23b which rides in a slot (not shown) in the curtain. The provision of the curtain is helpful in clearing any jams which might occur in the chute as the buttons are fed from the hopper into the chute. Also, the curtain 23a is needed to cover the unused portion of the exit aperture 23 as the thickness of the chute 40 is changed.

Button Aligning

As the spring fingers 32 are rotated in the hopper by the motor 30, they engage the buttons therein and move them around. As shown, the hopper 20 is mounted at an angle so that the buttons fall by gravity and are moved by the spring fingers to the hopper exit aperture 23 which is shown in greater detail in FIG. 4.

The two pieces of the front chute member 45, which form the track 42, extend upwardly for a short distance into the bowl exit aperture. As seen in FIG. 4, the left piece 45 has a sloping shoulder 48 and a vertical notched cutout 49 at its inner edge. The buttons are continuously rotated in the hopper by the fingers 32. If they are aligned with their shanks facing the hopper bottom wall 24 they cannot enter the track 42 formed by the front chute member pieces 45. However, if they are aligned with their heads on the bottom wall, then the shanks will fall into the track entrance defined by the sloping shoulder 48 and the notch 49. If in turn the shank 11 of the button in the top of the chute entrance is aligned so that its larger dimension is vertical, the shank fits into the track 42 and the button falls by gravity down the chute 40 with its shank aligned in the track 42. If the button in the chute entrance is aligned so that the long dimension of its shank cannot enter the track 42, as shown for the top button in FIG. 4, then the shank is caught in the notch 49. As the spring fingers 32 rotate they engage the head of the button in the entrance way and rotate it in the direction shown by the arrow. The button is spun so that the long dimension of the shank can fall into the track and proceed downward by gravity feed. In this manner, the chute 40 is continually kept loaded with buttons, as long as there is a supply in the hopper.

Chute

As described previously, the chute 40 comprises a rear and front chute members 44 and 45, the latter being formed by two spaced, elongated pieces to define the track 42. Both the chute members 44 and 45 have complementary curved upper ends and, as also described previously, the hopper 20 is mounted at the upper end of the chute on the rear chute member 44.

To accommodate buttons with different head thicknesses, it is necessary that the space between the top surface of the rear chute member 44 and the inner surface of the front chute cover member 45 be adjustable. This is accomplished by a two-part mounting arrangement. As shown in FIGS. 2, 3 and 5, the top of the main base support 46 terminates in a two-legged yoke with legs 46a. The middle portion of the front chute member 45 is fastened by screws 47 (FIG. 1) to the front faces of the yoke legs. The rear chute member 44 is mounted between the legs 46a of the yoke (see FIG. 5) by two screw threaded pins 50, there being one of such pins located near the top of the yoke and one near the bottom.

The rear chute member 44 is partially drilled with two threaded holes 51 to accommodate the threaded pins 50 whose left ends extend through and are rotatable in holes 52 formed in the center wall of the yoke of base 46. Each threaded pin 50 has fixed shoulders 53 and 54 formed thereon on each side of the yoke wall to hold the pins from moving with respect to the yoke.

The top threaded pin 50 has a drive gear 56 mounted thereon at the rear of the yoke wall which engages an idler gear 57 rotatably mounted on a shaft 58 which is held in a bearing 59 in the yoke wall. A drive pinion gear 60 is in turn fixed to the left end of the bottom threaded pin 50 in meshing engagement with the pinion gear 57. A control knob 62 is connected to the left end of the upper drive pin 50 so that as the knob 62 is rotated, the gear 56 is turned. This in turn rotates the pinion gear 57 and the gear 60 which is connected to the lower threaded pin 50. Thus, as should be apparent, rotation of the control knob 62 moves the two threaded pins 50 at the same time, in the same direction either into or out of the threaded holes 51 in the rear chute member 44. Thus, the chute member is rigidly held by the two threaded pins 50 and its distance to the rear surface of the front chute member 45 is adjusted by turning the knob 62 in one direction or the other. This moves all components, such as the hopper 20, and its exit aperture 23, with respect to the front chute member 23.

As should be apparent, due to the fact that the hopper 22 is fixed to the upper end of the rear chute member 44 and this upper end is curved, an arrangement must be provided for maintaining some degree of parallelism between the front face of the rear chute member 44 and the inner surface of the front chute member 45 at the curved upper end. This parallelism is necessary since the distance between the front and rear chute members must be maintained substantially uniform throughout the entire chute length for the buttons to feed properly. The problem becomes particularly acute when the chute space is widened by turning control knob 62, which effectively reduces the space at the top of the chute.

To provide the needed parallelism both elongated pieces forming the front cover member 45 are split into a substantially flat lower section and a curved upper section complementary to the curved rear chute member at point 45a. The two sections are held together by a hinge 45b of spring material which is welded or held by some other suitable fastening means onto the two sections.

The upper, curved, section of the front cover plate 45 above the split 45a is made adjustable toward or away from the rear chute member 44 by a saddle 64 which is fastened to the top of chute member 45. As shown in FIG. 1, the saddle 64 has a slot cut therein to permit the passage of the shank of the button.

A bracket 66 is connected to each end of the saddle 64, these ends extending slightly beyond the edges of the front cover member 46 (FIG. 1). A screw 68 passes through the rear of the bracket 66 and is threaded into a hole 69 in the rear chute member 44. A retaining washer 67 is provided on the inner face of the bracket 66. As the screw 68 is rotated, it moves into or out of the hole 69 with the upper ends of the bracket connected to the saddle 64 moving the connected front cover member 45 about the hinge piece 45b toward or away from the rear chute member 44. Thus the correct spacing between chute members at the curved upper portion of the chute is achieved by moving the front chute member 45 with respect to the rear chute member through screw 68. The spacing at the bottom end of the chute is obtained by turning control knob 62 to move the rear chute member with respect to the stationary front member.

To reduce any play between the rear chute member 44 in the front chute cover 45, a pair of rollers 76 (FIG. 3) are provided, one above the upper pin 50 and the other below the lower pins 50 of the chute-adjusting mechanism. As seen best in FIG. 5, which shows the details of one roller—the other being the same, the roller 76 is rotatably mounted in a bracket 77 which is connected to a threaded screw 78, screwed into a hole 79 in the side of the rear chute member 44. The inner face of one of the legs 46a of the base yoke 46 is milled out with a slot 80 therein to accommodate the roller 76. Thus, as the control knob 62 is turned to move the rear chute member 44 relative to the base member 46, the rollers 76 ride in the tracks 80. As should be apparent, the rollers prevent any play between the base member 46 and the rear chute member 44 and thereby between the front and rear chute members. As many of these rollers may be provided as needed.

Ram Arm and Drive

As shown in FIG. 1, the buttons fall by gravity down the track 42 of the chute. The buttons are aligned in the chute so that they are all oriented in the upper part of the chute with their shanks substantially vertical. The alignment of the buttons in this manner as well as the adjustment of the chute spacing has been described previously.

The bottom portion of the chute 40 curves to a substantially horizontal output end 41 so that at this output end the buttons shanks 11 assume a substantially horizontal position. From the chute output they are to be positively fed by the ram actuating arm 90 one at a time into the button holder 140.

The ram arm 90, as shown in FIG. 1, is an elongated member formed by two pieces 90a and 90b connected together by a pin 90c. The rear end of the piece 90a is connected by a pin 92 to the bottom of a bellcrank lever 81. The mounting of one or both pins 90c and 92 is preferably made adjustable with respect to the members 90a and crank lever 81 so that the effective length of ram arm piece 90a can be selected. This controls the length of stroke of the ram arm. The upper end of the bellcrank lever 81 is pivoted on an adjustable pivot 82, under the head of a screw 83 mounted on an extension plate 85 which is connected to the main support base 46.

A power driven clutch 86 is also mounted on the extension bracket 85. The clutch has a head 86a with an eccentrically mounted pin 87 which fits within a slot 81a on the crank arm 81. The clutch input is connected to the output shaft of a motor 88 mounted on the extension plate 85. When energized by a suitable electric circuit (not shown), such as a microswitch or any other suitable switch under the control of the operator and usually operated by a his or her foot, the clutch 86 is caused to turn its output head 86a through one complete revolution. A microswitch 89, having an actuating arm 89a, is also mounted on the extension plate 85 to engage a projection 86b on the drive head 86a of the clutch. After the clutch goes through one revolution, the projection 86b engages the lever arm 89a to actuate the switch 89 to break the clutch circuit. This insures that there is only one rotation of the clutch each time that it is energized. The clutch 86 and motor 88 are of any conventional construction, one preferred type being Model 160 made by Warner Electric Company of Chicago, Ill.

For each revolution of the clutch head 86a, the eccentrically mounted pin 87 moves down and then up in the slot 81a of the crank arm 81. As the pin 81a moves down, it moves the crank arm and the ram arm 90 to the left to feed a button. As the clutch rotates to move the eccentric pin 87 up and the crank arm 81 to the right, the ram arm 90 is retracted to its rest position.

The stroke of the crank arm 81, and thereby the stroke of the ram arm, is adjustable by moving the pivot 82. This is accomplished by the screw 83 which permits the pivot 82 to be located at one of a number of positions determined by screw-threaded holes (not shown) on the extension plate 85.

The details of the ram arm 90 and its operation to feed buttons is shown in greater detail in FIGS. 7 and 8. Referring to these two FIGS., the left piece 90b of the ram arm carries a projecting finger 94 whose left end has approximately a 90° bend in it to permit the finger end to ride in the track 42 at the bottom, substantially horizontal, portion of the chute.

As shown in FIGS. 7 and 8, the finger 94 is a separate piece having upper and lower flanges 95 thereon which permit the finger to be pivotally mounted by pin 96 to the bifurcated end of the ram arm portion 90b. The flanges 95 have tips 95a which engage a leaf spring 97 which is mounted on the arm piece 90b by any suitable fasteners such as the screws 98. The arm piece 90b rides within a track 99a formed in a housing 99 which is fastened to the bottom of the chute member 45.

As shown best in FIG. 7, a leaf spring retaining finger 100 is also attached to the housing 99 by any suitable fasteners such as the screws 101 and this finger has a downwardly extending end 102 which extends into the track 42 near the chute output 41.

Another spring member 106 is fastened to the top of the housing 99 by a screw 107 to limit the outward movement of the finger 100. The end of finger 100 engages the shank of the last button in the chute to prevent the buttons from leaving the chute by the force of gravity. To put it another way, it is the function of the ram arm 90 to move the next button to be fed out past the finger 100 into the button holder member 150.

BUTTON HOLDER

Figure 8A:
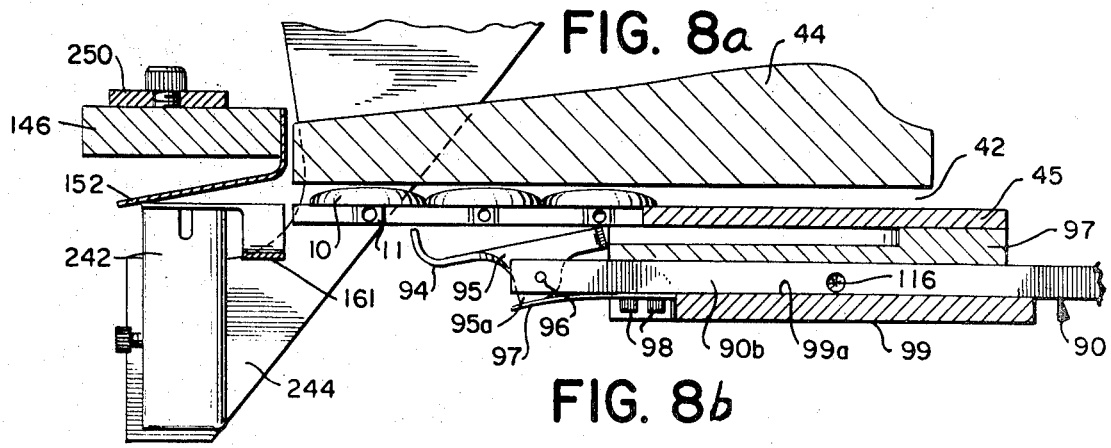
FIGS. 8a and 8b are top views, taken partially in section, showing the button holder and the ram finger.
Figure 8B:
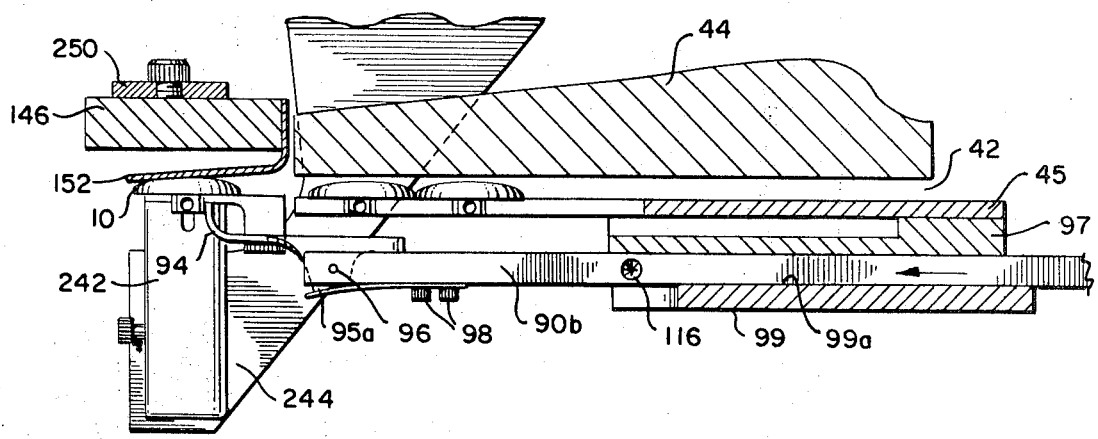
Figure 9:
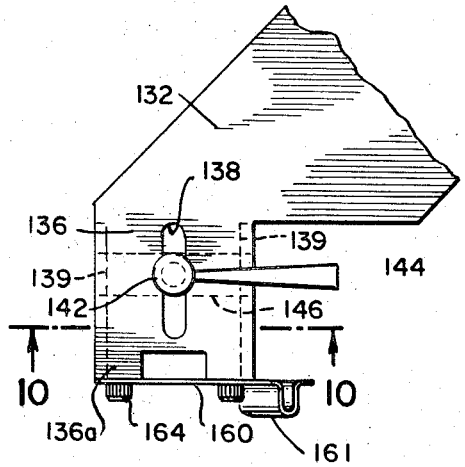
FIG. 9 is a top view of the button holder.
Figure 10:
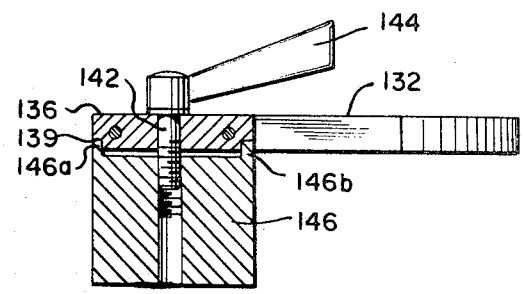
FIG. 10 is a front view of the button holder taken in section along lines 10-10 of FIG. 9.

The button holder is shown in detail in FIGS. 7 through 10. As seen in FIGS. 7, 9 and 10, a top plate 132 is held by suitable fasteners such as screws 134 to a milled out portion of the rear chute member 44. Top plate 132 has an extending arm 136 which is cut with a central slot 138 and has a milled slot 139 on each edge thereof. A screw 142 with a wing nut 144 fits within the slot 138 and holds thereon a rigid rear plate member 146 of the holder 150. The screw 142 is not shown in FIG. 7 for the sake of clarity. The rigid plate 146 has a pair of legs 146a and 146b which extend into the slots 139 to keep the plate aligned.

A flat leaf spring 152 is mounted along a bent right edge on one sidewall of the back plate 146 by any suitable means such as by welding, soldering rivets, or screws (not shown). The leaf spring 152, as shown best in FIGS. 7 and 8, is bent over the right sidewall of the back plate 146 and extends at an angle to partially cover the front of back plate 146 and to be spaced therefrom in the area in which a button is to be fed. As shown in FIG. 7, there is space between the leaf spring 152 and a front clamp plate 160 with the space being located opposite the output end of the chute so that the button may be fed therein between the leaf spring and the clamp plate 160. The clamp plate 160 is of generally Y-shaped construction with a pair of upper arms 160a and 160b which are held, such as by screws 164, to bifurcated arms 136a and 136b FIG. 9 on the projection 136 of the top plate 132. The needle 302 of the sewing machine passes through the space between the arms 136a and 136b and the clamp plate 160. A cross arm 160c joins the two upper arms of the clamp plate 160 and a depending arm 160d extends downwardly in a generally vertical direction from the right hand end of the cross arm 160c. A terminating arm 160e projects to the left from arm 160d.

The downwardly extending arm 160d is formed with a hollow bulge 161, such as by bending of arm 160d, so that the shanks of the buttons may be passed within the bulge 161 as the ram arm is driven to the left. Also, the bulge 161 is large enough to permit the projecting finger 94 of the ram arm to pass therethrough (see FIG. 8b).

The entire front clamp assembly 160 with its various arms are made of a suitable rigid material. There is no need for the clamp 160 to be resilient since all the resiliency that is needed to hold a button is provided by the rear leaf spring member 150.

The operation of the button holder is relatively simple. The holder 150 is moved to align the front clamp plate 160 generally with the front cover member 45 at the chute output 41 by loosening screw 142 and moving the rear plate 146.

It should be noted that the arrangement of the angled leaf spring 152 simplifies the adjustment of the holder older since t is not necessary to precisely align the rear chute member 44 with the spring 152 for each different thickness of button being fed. It is only necessary that the spring 152 be brought into a generally opposing relationship with the discharge end 41 of the chute since for a wide variety of buttons of sufficient thickness, the leaf spring 152 will be depressed sufficiently and have sufficient force to hold the button against the front clamp plate 160.

Operation of Ram Arm and Button Holder

Considering now the operation of the ram arm moving a button into sewing position in the button holder 150, reference is made to FIGS. 7a, 7b, 7c and 8a and 8b. FIGS. 7a and 8a show the ram arm 90 in the rest position awaiting energization of the button feeder by the operator to feed a button into the holder. As shown, the projecting finger 94 is pivoted out from the track 42 with its rear edge cammed against the left sidewall of the housing 99. In this position, the buttons in the track 42 are held by the projecting finger 100 which engages and holds the shank of last button in the chute, that is, the button which is to be fed into the holder by the ram arm.

When the operator energizes the clutch, the crank arm 81 is turned and the ram arm 90 is moved to the left. As the ram arm 70 begins its move to the left, the rear end of the ram finger 94 drops off the cam surface of housing 99 so that its projecting bent end portion under the urging of spring 97 drops into the track 42 and engages the shank 11 of the last button 10 in the chute on its right side. The ram arm 11 continues to move to the left pushing the button into the holder 150 a distance which is set by the travel of the ram arm. This travel is determined by the adjustments 83 on the crank arm mechanism and is set so that the shank of the button is aligned approximately in the center of the space between the two legs 136a and 136b of the top plate. The finger 94 passes under the bulge 161 in the front clamp plate and deposits the button on the holder at this location, as shown in FIGS. 7b and 8b. The force of the finger is sufficient to depress the spring 152.

As shown in FIGS. 7b and 8b, only one button is fed at a time by arm 90. The remaining buttons in the chute are held by the spring finger 100 as the last button in the chute is moved past finger 100 into the holder 150.

In the retraction portion of the cycle, that is, when the ram arm 90 is moved to the right, the projecting portion of finger 94 pivots over the shank of the last button now being held in the chute by the finger 100 to clear this button. It is held in this outward position as shown in FIG. 8a by the camming action of the left end of housing 99.

The travel to the right of the ram arm 90 is limited during retraction by a spring biased detent pin 114 which is held within the housing 99. A notch 116 is cut into the arm portion 90b so that as the arm is retracted to the right by crank 81, its movement is limited when the pin 114 drops into the notch 116.

It should be understood from the foregoing that the ram action insures a positive feed of the buttons at all times rather than just a gravity of feed. This arrangement reduces the jamming which occurs with purely gravity-fed machines. Also, it permits better clamping of the button in the holder 150 because a stronger spring 152 can be used since this spring can be easily depressed by the ram-arm action whereas it could not be merely by a gravity feed operation.

Shoe

The shoe 240 is of conventional construction and comprises an anvil 242 mounted on a shoe plate 244. The shoe plate 244 is connected to any conventional mechanism (not shown) which can be raised and lowered under the control of the operator. The upward travel of the anvil 242 is limited by a stop plate 250 which is adjustably mounted by means of a screw 250 riding in a slot 254 which is attached to the back plate 146 of of the button holder.

The raising and lowering of the shoe plate and anvil is shown in FIG. 7. As shown in sequence in FIG. 7a, when the machine is at rest awaiting the start of the next cycle, the anvil 242 is at its lowermost position. After the button is advanced into the button holder, shown in FIG. 7b, the shoe 242 is still in its lowermost position until it is raised upwardly by the operator, as shown in FIG. 7c. Here the needle 302 of the sewing machine can be moved downwardly to accomplish the sewing operation on the cloth 260 held on top of the shoe. As seen in FIG. 7c the sewing needle 302 passes outside the front clamp plate 160 and through the hole in the button shank to be sewn onto the cloth.

General Operation of the Machine

The general operation of the button feeding machine of the present invention may be described as follows. Buttons are loaded into the hopper at 20 in any desired quantity. If desired, a screen may be utilized to prevent the buttons from being spilled out of the hopper. The spacing between the front and rear members of the chute is set by the two step operation, control knob 62 for the flat lower portion and screw 68 for the curved upper portion, to accommodate the particular size button being fed.

The hopper motor 30 is turned on and the spring arms 32 rotate to push the buttons into the outlet 23 of the hopper where they are aligned by the shoulder and notch 48, 49 (FIG. 4) on the front chute member 45 to go shank outwardly in the slot 42 of the chute. The buttons then fall downwardly in the chute 40 by gravity, the last button being held at the output end of the chute by the spring finger 100.

To initiate a cycle of operation of the machine, that is, to feed a button from the chute into the holder, the operator depresses a switch (not shown) to energize the motor driven clutch 86. This moves the crank arm 81 pushing the ram arm 90 first to the left and then to the right. When moving to the left the projecting finger 94 of the ram arm engages the shank of the last button in the track 42 of the chute, pushes this button under and away from the spring holding finger 100 and into the button holder 150. The button is held between the front clamp plate 160, which is substantially rigid, and the rear leaf spring 152, this spring providing the necessary resiliency to hold the button firmly. The ram arm retracts and as it moves to the right, the pivotally mounted finger 94 moves over the shank of the last button now being held in the track by the spring finger 100 and is cammed outwardly against the housing 99. The shoe 240 is then lowered and the sewing operation is completed on the button which is in the button holder. The shoe is then raised and the machine is ready for the next button-feeding cycle which is commenced by the operator energizing the clutch 86.

The button-feeding machine of the present invention has several advantages. First of all, the hopper is of relatively simple construction and the buttons therein are aligned in the chute track in a novel manner. In addition, even though a two-section track is used, the adjustment of the front and rear chute members is quite easy. Further, the buttons are positively fed from the chute for a predetermined distance in accordance with the stroke of the ram arm to positively locate the buttons in the holder. It has also been found that the machine of the subject invention operates quite rapidly and at a reduced noise level.

While a preferred embodiment of the invention has been described above, it will be understood that this is illustrative only, and the invention is limited solely by the appended claims.

I claim:

1. A button-feeding machine for shank-type buttons comprising a hopper having a discharge aperture, a chute having an inlet end positioned adjacent the discharge aperture for receiving buttons from said hopper with the shanks facing outwardly from said chute, a button holder adjacent the outlet end of said chute, means for controllably feeding said buttons from said chute into said button holder, said feeding means comprising a ram arm having an end with a spring biased portion extending inwardly for engaging the base of the shank of the last button in said chute, fixed guide means within which said ram arm travels, two-way drive means connected to said ram arm which drive means upon actuation operates to perform an uninterrupted cycle for reciprocating said ram arm so that said inwardly extending portion engages the base of the shank of said last button and moves it from said chute into said holder as said drive means moves said arm in one direction for a predetermined distance and for retracting said ram arm in a direction opposite said one direction as part of the cycle.

2. The machine of claim 1 wherein said drive means connected to said ram arm includes a rotatable member having an eccentrically mounted pin, a lever having a slot therein in which said pin travels, means pivotally mounting said slot at one end thereof, means for pivotally mounting said ram arm to the other end of said lever, the rotation of said rotatable member reciprocating said arm for said predetermined distance in each of said first and second directions along the same line.

3. The machine of claim 1 wherein said chute has a track therein for receiving the shanks of buttons, the spring biased portion of said ram arm comprising a finger on the free end of said ram arm which has a curved portion which extends into said track to engage the shank of the last button therein to thereby move the last button into said holder when reciprocated.

4. The machine of claim 3 further comprising means for pivotally mounting said finger on said ram arm to move the finger outwardly of the track on the return stroke so that the finger passes over the shank of the last button in the chute.

5. The machine of claim 4 further comprising stationary resilient means for engaging the forward edge of the shank of the last button in the track for holding the last button in the track and all other buttons therein, the finger of the ram arm pushing said last button past said holding means on its forward stroke.

6. The machine of claim 5 wherein said resilient means comprises a leaf spring.

7. The machine of claim 1 further comprising latch means for engaging the ram arm to stop its motion on the return stroke.